United States Patent [19]
Bach et al.

[11] Patent Number: 6,088,569
[45] Date of Patent: Jul. 11, 2000

[54] METHOD AND APPARATUS FOR RECEIVING A PLURALITY OF SIGNALS HAVING DIFFERENT FREQUENCY BANDWIDTHS

[75] Inventors: Christopher R. Bach, Elgin; Patrick D. Smith, Schaumburg, both of Ill.

[73] Assignee: Motorola, Inc., Schaumburg, Ill.

[21] Appl. No.: 09/065,313

[22] Filed: Apr. 23, 1998

[51] Int. Cl.[7] ......................................... H04H 1/00
[52] U.S. Cl. ................. 455/3.1; 348/7; 455/207; 455/249.1; 455/307; 455/313; 455/339; 455/340
[58] Field of Search ................... 348/7, 12, 13, 348/731; 455/5.1, 4.2, 3.1, 307, 314, 339, 340, 350, 315, 295, 249.1, 313, 207, 266; H04N 7/173

[56] References Cited

U.S. PATENT DOCUMENTS

| | | | |
|---|---|---|---|
| 5,270,824 | 12/1993 | Dobrovolny | 358/191.1 |
| 5,812,928 | 9/1998 | Watson, Jr. et al. | 455/5.1 |
| 5,835,844 | 11/1998 | Stoneback et al. | 455/5.1 |
| 5,835,845 | 11/1998 | Niki et al. | 455/5.1 |
| 5,852,772 | 12/1998 | Lampe et al. | 455/226.2 |

FOREIGN PATENT DOCUMENTS

| | | | |
|---|---|---|---|
| 2233520 | 1/1991 | United Kingdom | H03D 7/16 |

OTHER PUBLICATIONS

Stephen J. Erst, Tunable crystal filter accepts any frequency, MICROWAVES, vol. 17, No. 11, p. 94, Nov., 1978.

*Primary Examiner*—Andrew I. Faile
*Assistant Examiner*—Habte Bahgi
*Attorney, Agent, or Firm*—Romi N. Bose

[57] ABSTRACT

A first mixer (306) shifts a first end (208) of a desired signal frequency bandwidth (206) of a desired signal (202) to an edge (508) of a first filter frequency bandwidth (502) of a first filter (312), wherein the first filter frequency bandwidth (502) is greater than the desired signal frequency bandwidth (206). Signals within a first undesired frequency spectrum (504) are attenuated by the first filter (314). A second mixer (316) shifts a second end (210) of the desired signal frequency bandwidth (206) to an edge (608) of a second filter frequency bandwidth (602) of a second filter (320) to receive the desired signal (202).

17 Claims, 4 Drawing Sheets

METHOD AND APPARATUS FOR RECEIVING A PLURALITY OF SIGNALS HAVING DIFFERENT FREQUENCY BANDWIDTHS

BACKGROUND OF THE INVENTION

This invention relates generally to receivers and specifically to a method, apparatus and system for receiving a plurality of signals having different frequency bandwidths.

Typical communication systems involve transmitting and receiving signals that have an approximately fixed frequency bandwidth. However, some systems allow for signals having different bandwidths. For example, one such system is being proposed by the Multimedia Cable Network System (MCNS) consortium for data over cable television communication in the Data Over Cable Service Interface Specification (DOCSIS). The specification proposes a standard for data communication that will allow for signals transmitted in the upstream direction (from the subscriber to the head-end office) to have one of five different bandwidths. Therefore, the receivers at the head-end will be required to have the ability to receive signals that may have any one of the five frequency bandwidths.

Typical receivers contain a first mixer that shifts the incoming signal to an intermediate frequency (IF) before the signal is filtered through an IF filter. The IF filter is typically chosen to have a frequency pass band that is slightly wider than the incoming signal. Therefore, in systems that allow transmitted signals to have one of a variety of frequency bandwidths, the IF filter will not be able to effectively filter a signal with a bandwidth that is substantially narrower than the bandwidth of the IF filter.

One attempt at solving this problem includes using multiple IF filters having different frequency bandwidths and switching the appropriate IF filter into the receiver circuitry in order to receive a particular signal. However, this attempt is expensive and requires additional circuitry. In addition, this attempt is inefficient since it requires a finite time to switch from receiving a signal having one bandwidth to a signal having a different bandwidth.

Therefore, there exists a need for a method, apparatus, and system for efficiently and inexpensively receiving a plurality of signals having different frequency bandwidths.

DETAILED DESCRIPTION OF THE PREFERRED EMBODIMENT

The present invention provides a method, apparatus, and system for efficiently and inexpensively receiving a signal having any one of a plurality of frequency bandwidths.

An incoming desired signal is shifted such that one end of a frequency bandwidth of the desired signal is shifted to the edge of a filter frequency bandwidth of a first filter. The first filter attenuates any undesired signals within a first undesired frequency spectrum (outside the frequency bandwidth of the first filter). However, the first filter is designed to have a frequency bandwidth slightly wider than the widest possible signal bandwidth. Therefore, if the desired signal that is being received has a bandwidth significantly narrower than the first filter, other undesired signals are still present at the output of the first filter.

In this case, the desired signal is shifted such that a second end of the desired signal is shifted to the edge of a second filter frequency bandwidth. The second filter attenuates undesired signals within a second undesired frequency spectrum. These undesired signals are the signals "missed" by the first filter.

Therefore, the first and second filters are designed to filter the widest possible desired signal frequency bandwidth but are still used to filter narrower signals by shifting the desired signal to one edge of a first filter frequency bandwidth and then to a edge of a second filter frequency bandwidth.

Figure 1:
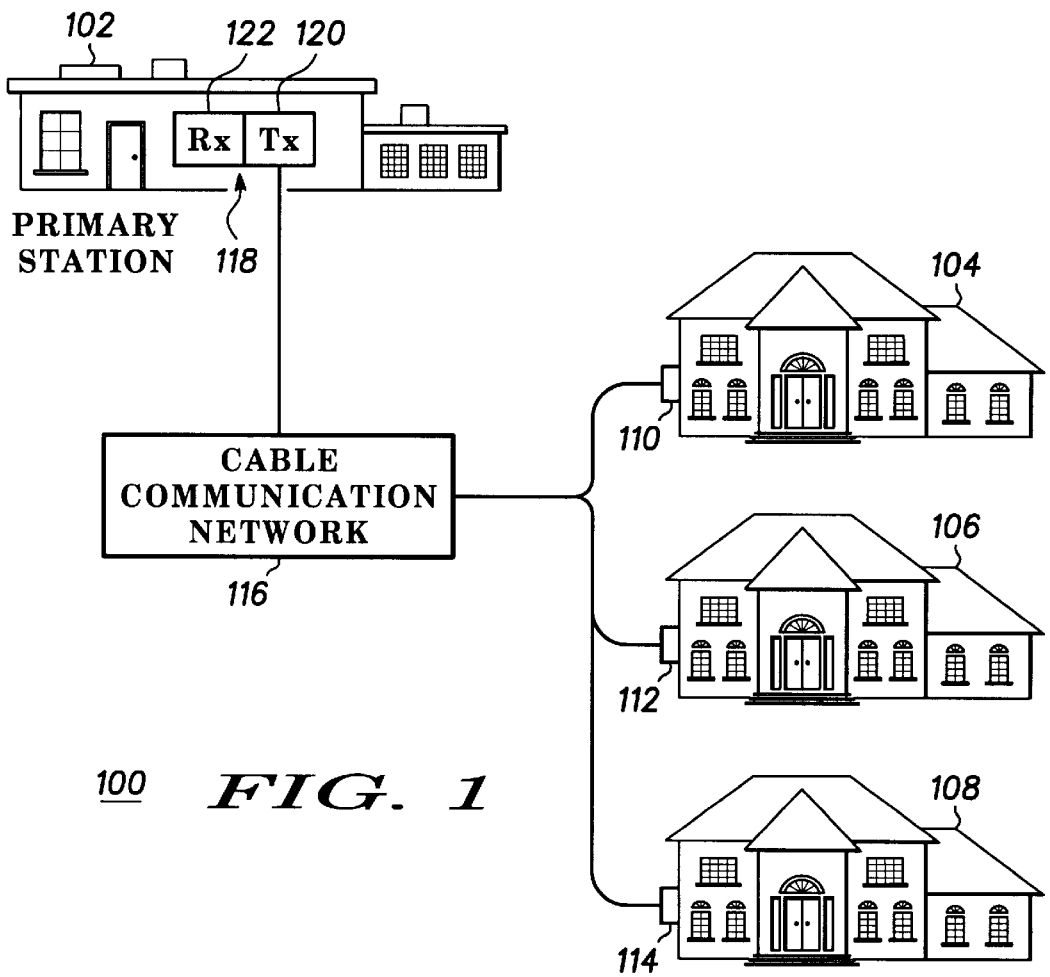
FIG. 1 is a block diagram of a communication system in accordance with a preferred embodiment of the invention.

Referring to the figures, FIG. 1 is a block diagram of a communication system 100 in accordance with the preferred embodiment of the invention. In the preferred embodiment, the communication system 100 is a cable television (CATV) communication system 100 where a primary station (head-end) 102 supplies telephone, data, video and other services to a plurality of subscriber premises (104–108). The primary station (head end) 102 provides these services by communicating with a plurality of secondary stations (subscriber units)(110–114) through a cable communication network 116. The communication system 100, however, may be any one of many types of wired or wireless communication systems including telephony, cellular telephony, video, two way radio, microwave and other communication systems.

Preferably, the cable communication network 116 consists of hybrid fiber/coaxial cables, splitters, amplifiers and other equipment as known in the art. Upstream signals are defined as signals transmitted from the secondary stations 110–114 to the primary station 102 through the cable communication network 116. Downstream signals are defined as signals transmitted from the primary station 102 to the secondary stations 110–114. The primary station 102 includes at least one transceiver 118 that includes a transmitter 120 transmitting downstream signals and a receiver 122 receiving upstream signals.

Various communication methods and protocols are known for communicating within cable communication systems and for brevity, only a general overview is presented. Preferably, the communication system 100 utilizes TDM techniques with a portion of the available frequency spectrum allocated for downstream signals and another portion allocated for upstream signals. As discussed in the background and as discussed in further detail below, the MCNS has proposed a specification allowing for upstream signals to have any one of five frequency bandwidths. Preferably, the downstream signals consist of modulated radio frequency (RF) carriers conveying real-time video as well as data, telephony, video telephony and other services using a TDMA protocol.

Figure 2:
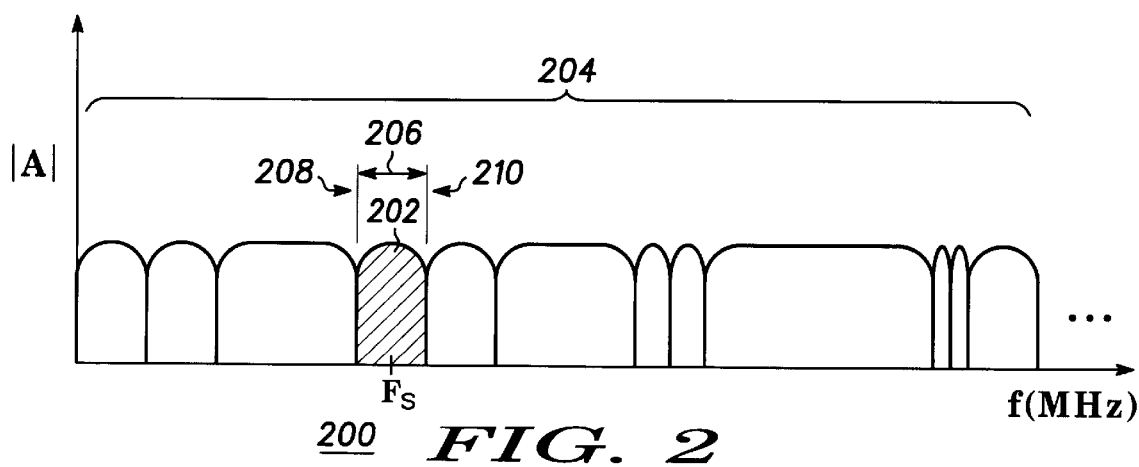
FIG. 2 is a graphical representation of an upstream frequency spectrum 200 in accordance with the preferred embodiment of the invention.

FIG. 2 is a graphical representation of an upstream frequency spectrum 200 in accordance with the preferred embodiment of the invention. A desired signal 202 is transmitted within a plurality of signals 204 according to the protocol of the particular communication system 100. The desired signal 202 has a desired signal frequency bandwidth 206 having a first end 208 and a second end 210. Preferably, the desired signal frequency bandwidth 206 is centered around a desired signal frequency (Fs). The desired signal 202 is a signal transmitted by a secondary station 110 that is to be received by the primary station 102. As can be seen in FIG. 2, the plurality of signals 204 include signals having any one of several frequency bandwidths. In the preferred embodiment, the plurality of signals 204 may have any one of five different frequency bandwidths as defined by the MCNS proposed specification.

Figure 3:
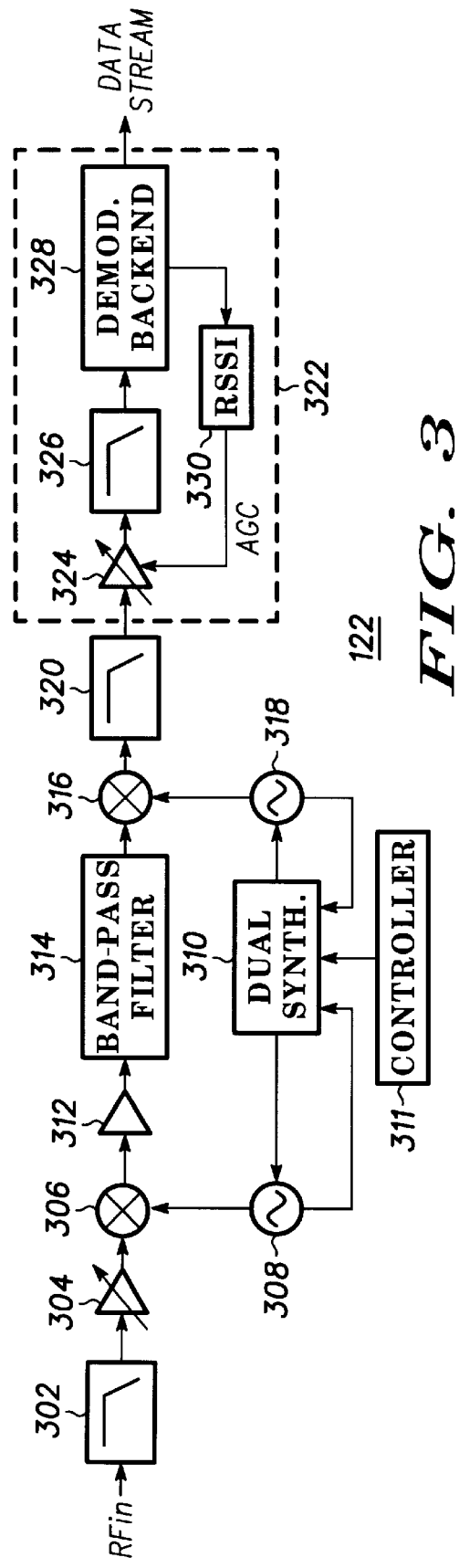
FIG. 3 is a block diagram of the receiver 122 in accordance with the preferred embodiment of the invention.

Referring now to FIG. 3, FIG. 3 is a block diagram of the receiver 122 in accordance with the preferred embodiment of the invention. A low pass filter 302 receives the incoming upstream frequency spectrum 200 and allows only desired system signals (potential desired signals that are part of the system protocol) to pass. A variable amplifier 304 adjusts the amplitude of the incoming upstream signals to minimize the nonlinearities in the receiver 122. In addition, the variable amplifier 304 reduces the requirements of an automatic gain control (AGC) loop 322 discussed below.

The filtered and amplified frequency spectrum is frequency shifted by mixing the desired signal 202 and the remaining plurality of signals 204 with a first local oscillator signal (LO1 signal) in a first mixer (first frequency shifter) 306. The LO1 signal is produced by a first local oscillator (LO1) 308 and a dual synthesizer 310. A controller 311 determines the value of the LO1 signal based on the frequency of the desired signal 202, the desired signal frequency bandwidth 206, and other factors as discussed below in reference to FIG. 5. The controller 311 sends a control signal to the dual synthesizer 310 to set LO1 308 to the appropriate frequency. The resulting frequency shifted signals are amplified by an amplifier 312 in order to maintain an acceptable signal to noise ratio throughout the receiver stages.

Figure 4:
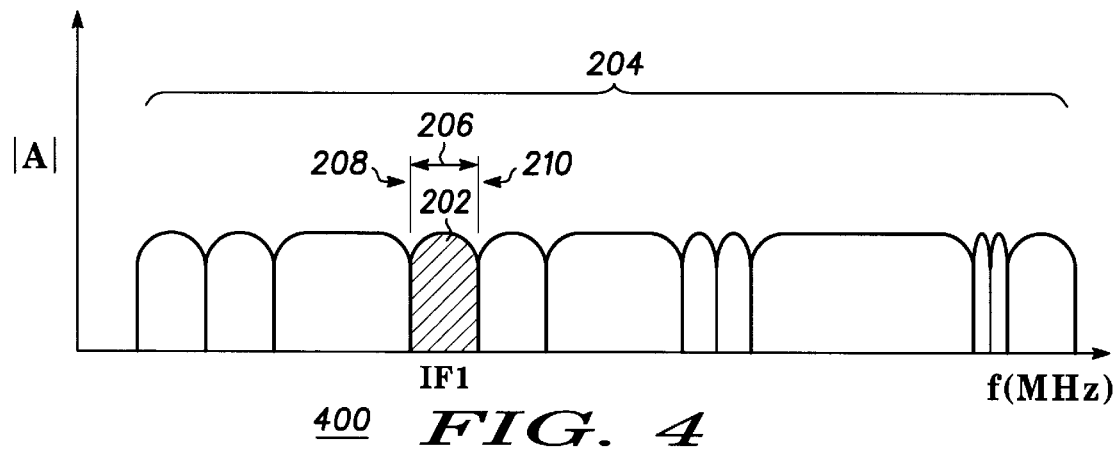
FIG. 4 is a graphical representation of a frequency spectrum 400 at an output of the amplifier 312 in accordance with the present invention.

FIG. 4 is a graphical representation of a frequency spectrum 400 at an output of the amplifier 312 in accordance with the present invention. In the preferred embodiment, the desired signal bandwidth 206 is centered around a first intermediate frequency (IF1) equal to the difference of the frequency values of Fs and LO1. The plurality of signals 204 are frequency shifted such that each signal of the plurality of signals 204 is now at a frequency equal to the difference of the original frequency of the particular signal and LO1. Preferably, LO1 is higher in frequency than Fs. However, various conversion methods can be used, as known in the art, depending on the particular requirements of the communication system 100.

Referring again to FIG. 3, the frequency shifted signals at the output of the amplifier 312 are filtered by a band-pass filter 314. As will be explained below with reference to FIG. 5, undesired signals within a first undesired frequency band are attenuated by the band-pass filter 314. The band-pass filter 314 is designed to have frequency pass-band slightly wider than the frequency bandwidth of signal having the largest frequency bandwidth of the plurality of signals 204. A number of the plurality of signals (204) within a frequency pass-band of the band-pass filter 314, including the desired signal 202, pass through the band-pass filter 314.

Figure 5:
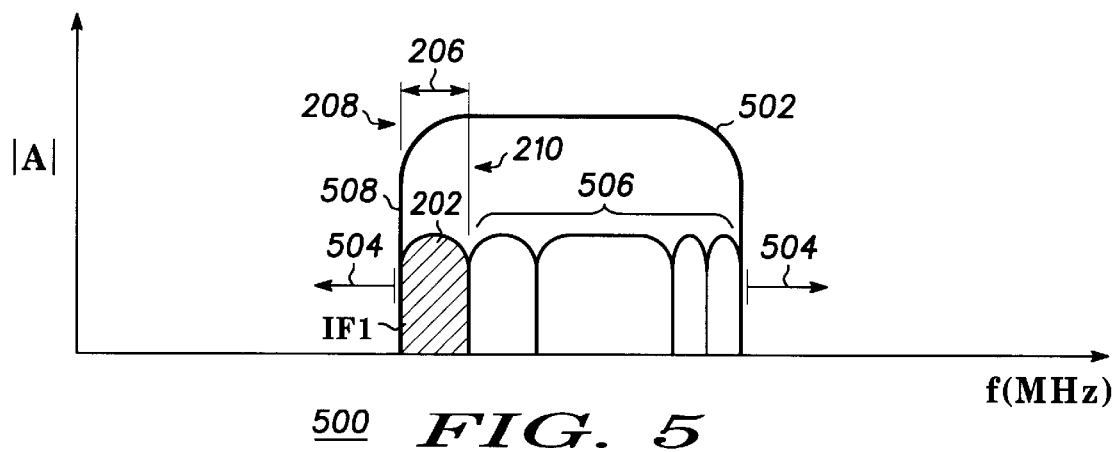
FIG. 5 is graphical representation of a frequency spectrum 500 at the output of the band-pass filter 314 in accordance with the preferred embodiment of the invention.

FIG. 5 is graphical representation of a frequency spectrum 500 at the output of the band-pass filter 314 in accordance with the preferred embodiment of the invention. The desired signal 202 and other signals 506 within the pass-band (first filter frequency bandwidth) 502 of the band-pass filter 314 are not significantly effected while signals outside the pass-band 502 (in a first undesired frequency spectrum 504) are attenuated. As can be seen in FIG. 5, the first end 208 of the desired signal bandwidth is at an edge 508 of the filter frequency bandwidth 502. The controller 311 determines IF1 to be such that the first edge 208 of the desired signal at the edge of the first filter frequency bandwidth 502 of the band-pass filter 314. Factors that are used in determining LO1 (and therefore IF1) include the frequency of the desired signal 202, the desired signal frequency bandwidth 206, a frequency response of the band-pass filter (first filter frequency bandwidth) 502 and other criteria as required by the particular communication system 100. If the desired signal bandwidth 206 has the widest signal of the plurality of signals, the desired signal bandwidth 206 is centered within the first filter frequency bandwidth 502.

Referring again to FIG. 3, the signals that pass through the band-pass filter are frequency shifted by mixing the signals at the output of the band-pass filter with a second local oscillator signal (LO2 signal) in a mixer 316. The LO2 signal is produced by a second local oscillator (LO2) 318 and the dual synthesizer 310 using known techniques. In the preferred embodiment, the desired signal bandwidth 206 is centered around a second intermediate frequency (IF2) equal to the difference of the frequency values of LO2 and IF1. The controller 311 sends a control signal to the synthesizer 310 to set the value of LO2. The controller 311 determines LO2 (and therefore IF2) based on the desired signal frequency bandwidth 206, the frequency of the desired signal (Fs) 202, and a frequency response of a low pass filter 320. As is discussed below, the controller sets IF2 such that the second edge 210 is at the edge of a filter frequency bandwidth (frequency response) of the low pass filter 320.

Figure 6:
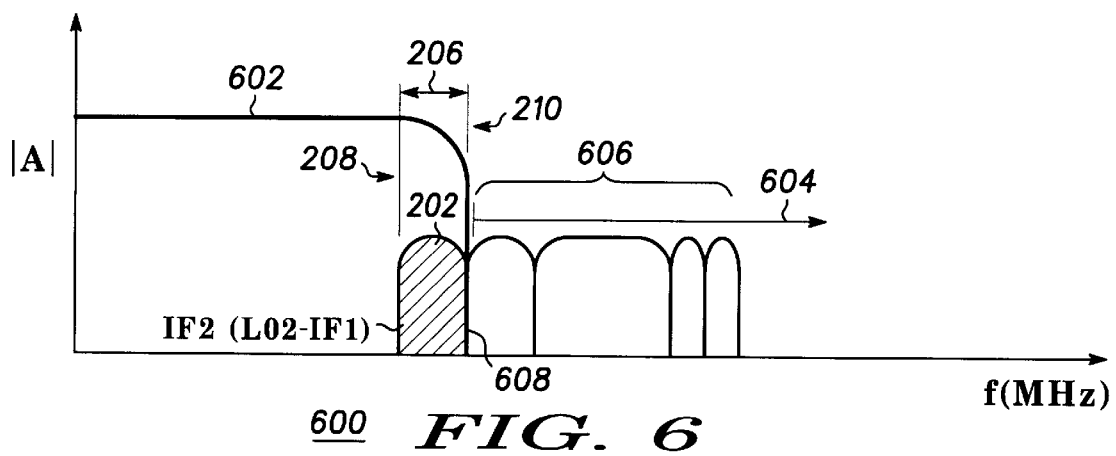
FIG. 6 is graphical representation of a frequency spectrum 600 at an output of the low pass filter 320.

FIG. 6 is graphical representation of a frequency spectrum 600 at an output of the low pass filter 320. The mixer 316 shifts the desired signal 202 to a frequency equal to the difference between LO2 and IF1. As is shown in FIG. 6, the second edge 210 of the desired signal frequency bandwidth is at the edge of the filter frequency bandwidth 602. The low pass filter 320 attenuates signals 606 inside a second undesired signal frequency spectrum 604. Therefore, the only signal present at the output of the low pass filter 320 is the desired signal 202.

Referring again to FIG. 3, an automatic gain control (AGC) loop 322 is formed by a variable amplifier 324, a low pass filter 326, demodulator back-end 328 and a received signal strength indicator (RSSI) 330. The AGC loop 322 is designed to maintain the amplitude of the desired signal 202 at a level required by the demodulator back-end 328 using known techniques. A filter 326 further filters the desired signal 202 to obtain greater selectivity and is preferably designed to have a slightly wider frequency response than the second filter 320 in order to reduce inter-symbol interference (ISI) distortion while still protecting the demodulator back-end 328 from nonlinear characteristics of variable amplifier 324. A data stream is produced at an output of the demodulator back-end 328 that is further processed by the receiver 122 using known techniques.

Figure 7:
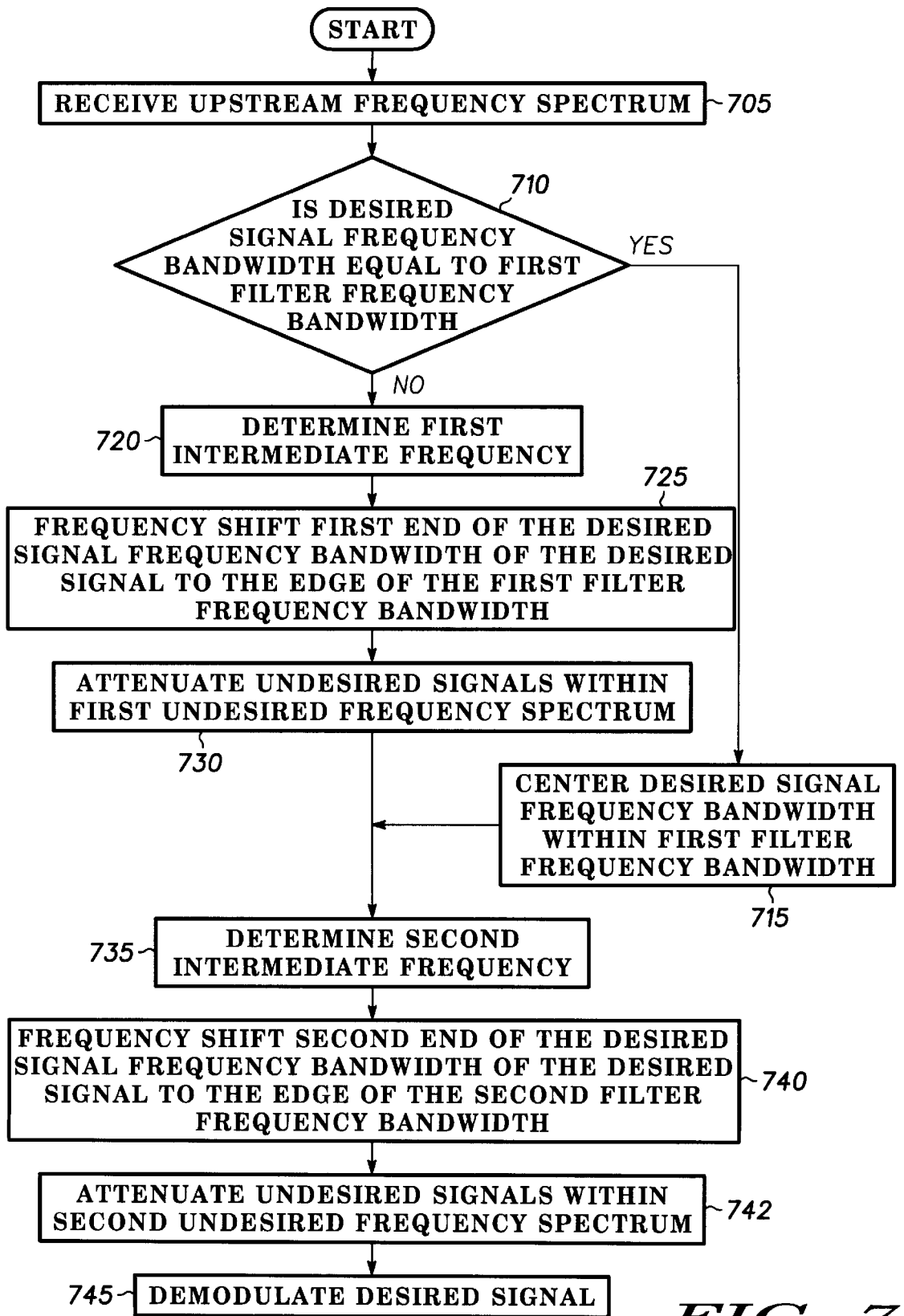
FIG. 7 is a flow chart of method in accordance with the preferred embodiment of the invention.

FIG. 7 is flow chart of a method in accordance with preferred embodiment of the invention. An upstream frequency spectrum is received at the receiver 122 in a primary station 102 at step 705.

At step 710, the controller 311 determines if the desired signal frequency bandwidth 206 is equal to the first filter frequency bandwidth 502. In the preferred embodiment, the controller determines the desired signal bandwidth 206 based on the particular subscriber unit 110. As dictated by the MCNS specification, a subscriber can only use one of the multiple defined bandwidth possibilities. The method proceeds to step 715 if the desired signal frequency bandwidth is equal to first filter frequency bandwidth 502. Otherwise, the method continues at step 720.

At step 715, the desired signal frequency bandwidth 206 is centered within the first filter frequency bandwidth 502.

At step 720, the controller 311 determines the first intermediate frequency based on the desired signal frequency bandwidth 206, the first filter frequency bandwidth 602 and the desired signal frequency.

At step 725, the first end 208 of the desired signal frequency bandwidth 206 of the desired signal 202 is shifted to the edge 508 of the first filter frequency bandwidth 502 of the first filter 314. As explained above, in the preferred embodiment, the desired signal is frequency shifted by mixing the desired signal 202 with the first local oscillator (LO1) signal in the first mixer 306. In the preferred embodiment, LO1 is higher in frequency than Fs. However, other methods of frequency shifting the desired signal to IF1 may be implemented depending on the particular communication system 100.

At step the 730, the first filter 314 attenuates the undesired signals within a first undesired frequency spectrum 504. As explained above, signals outside the first filter frequency bandwidth 502 are attenuated by the first filter 314. The desired signal 202 and some of the plurality of signals within the first filter frequency bandwidth 502 are not substantially effected.

At step 735, the controller 311 determines the second intermediate frequency and the second local oscillator frequency (LO2) based on the desired signal frequency bandwidth 206, the second filter frequency bandwidth 602 and the desired signal frequency.

At step 740, the second end 210 of the desired signal bandwidth 206 is frequency shifted to the edge 608 of the second filter frequency bandwidth 602 of the second filter 320. Preferably, the desired signal 202 is frequency shifted by mixing the desired signal 202 with LO2 in the second mixer (second frequency shifter) 316 to place the desired signal at IF2.

At step 742, the second filter 314 attenuates the undesired signals within a second undesired frequency spectrum 604. If the desired signal bandwidth 206 is less than the first filter frequency bandwidth 502, the second filter attenuates undesired signals 606 within the filter bandwidth 502.

At step 745, the desired signal is demodulated using known techniques.

Therefore, the receiver 122 can receive any of the plurality of signals (204) efficiently and inexpensively although the desired signal 202 may have any one of several frequency bandwidths. The desired signal 202 is shifted to the edge 508 of a first filter 314 to attenuate some of the undesired signals. The desired signal 202 is then shifted to the edge 608 of a second filter 320 to attenuate the remaining undesired signals 606 that were not attenuated by the first filter 314.

We claim:

1. A method comprising the steps of:
shifting a first end of a desired signal frequency bandwidth of a desired signal to an edge of a first filter frequency bandwidth of a first filter to determine a first undesired signal that is outside the first filter frequency bandwidth, wherein the first filter frequency bandwidth is greater than the desired signal frequency bandwidth;
attenuating the first undesired signal within a first undesired frequency spectrum; and
shifting a second end of the desired signal frequency bandwidth to an edge of a second filter frequency bandwidth of a second filter to determine a second undesired signal that was not attenuated in the attenuating step.

2. A method in accordance with claim 1 further comprising the step of attenuating the second undesired signal within a second undesired frequency spectrum.

3. A method in accordance with claim 2 wherein the step of shifting the first end of the desired signal frequency bandwidth comprises mixing the desired signal with a first local oscillator signal.

4. A method in accordance with claim 3 wherein the step of shifting the second end of the desired signal frequency bandwidth comprises mixing the desired signal with a second local oscillator signal.

5. A method comprising the steps of:
shifting a first end of a desired signal frequency bandwidth of a desired signal to an edge of a first filter frequency bandwidth of a first filter wherein shifting the first end of the desired signal frequency bandwidth comprises mixing the desired signal with a first local oscillator signal, wherein the first filter frequency bandwidth is greater than the desired signal frequency bandwidth wherein the step of shifting the first end of the desired signal includes shifting the desired signal to place the desired signal at a first intermediate frequency equal to the difference of a second local oscillator frequency of the second local oscillator signal and a desired signal frequency of the desired signal;
attenuating a first undesired signal within a first undesired frequency spectrum;
shifting a second end of the desired signal frequency bandwidth to an edge of a second filter frequency bandwidth of a second filter wherein shifting the second end of the desired signal frequency bandwidth comprises mixing the desired signal with a second local oscillator signal; and
attenuating a second undesired signal within a second undesired frequency spectrum.

6. A method in accordance with claim 5 wherein the step of shifting the second end of the desired signal includes shifting the desired signal to place the desired signal at frequency equal to difference of a second local oscillator frequency of the second local oscillator signal and the first intermediate frequency.

7. A method in accordance with claim 6 further comprising the step of determining the first intermediate frequency based on the desired signal frequency bandwidth, the frequency of the desired signal, and the first filter frequency bandwidth.

8. A method in accordance with claim 6 further comprising the step of determining the second local oscillator frequency based on the desired signal frequency bandwidth, the frequency of the desired signal, and the second filter frequency bandwidth.

9. A method comprising the steps of:
mixing a desired signal with a first local oscillator signal to shift a first end of a desired signal frequency bandwidth of the desired signal to an edge of a first filter frequency bandwidth of a first filter to determine a first undesired signal that is outside the first filter frequency bandwidth, wherein the first filter frequency bandwidth is greater than the desired signal frequency bandwidth;

attenuating a first undesired signal within a first undesired frequency spectrum;

mixing the desired signal with a second local oscillator signal to shift a second end of the desired signal frequency bandwidth to an edge of a second filter frequency bandwidth of a second filter to determine a second undesired signal that was not attenuated in the attenuating step; and attenuating a second undesired signal within a second undesired frequency spectrum.

10. A method in accordance with claim 9 further comprising the step of receiving a frequency spectrum including at least the desired signal, the first undesired frequency spectrum, and the second undesired frequency spectrum, the frequency spectrum received from a subscriber unit through a cable communication network.

11. An apparatus comprising:

a first filter having a first filter frequency bandwidth greater than a desired signal frequency bandwidth of a desired signal;

a first frequency shifter adapted to shifting a first end of the desired signal frequency bandwidth of the desired signal to an edge of the first filter frequency bandwidth to determine a first undesired signal that is outside the first filter frequency bandwidth;

a second filter having a second filter frequency bandwidth greater than the desired signal frequency bandwidth; and a second frequency shifter coupled between the first filter and the second filter and adapted to shifting a second end of the desired signal frequency bandwidth to an edge of the second filter frequency bandwidth filter to determine a second undesired signal that was not determined by the first frequency shifter.

12. An apparatus in accordance with claim 11 wherein the first filter is adapted to attenuating a first undesired signal within a first undesired signal spectrum.

13. An apparatus in accordance with claim 12 wherein the second filter is adapted to attenuating a second undesired signal within a second undesired signal spectrum.

14. An apparatus in accordance with claim 11 wherein the first filter is a band-pass filter.

15. An apparatus in accordance with claim 11 wherein the second filter is a low-pass filter.

16. An apparatus comprising:

a first filter having a first filter frequency bandwidth greater than a desired signal frequency bandwidth of a desired signal;

a first mixer adapted to mixing a first local oscillator signal with the desired signal to shift a first end of the desired signal frequency bandwidth of the desired signal to an edge of the first filter frequency bandwidth to determine a first undesired signal that is outside the first filter frequency bandwidth;

a second filter having a second filter frequency bandwidth greater than the desired signal frequency bandwidth; and a second mixer coupled between the first filter and the second filter and adapted to mixing a second local oscillator signal with the desired signal to shift a second end of the desired signal frequency bandwidth to an edge of the second filter frequency bandwidth to determine a second undesired signal that was not determined by the first frequency mixer.

17. A system comprising:

a subscriber unit adapted to transmitting a desired signal having any one of a plurality of frequency bandwidths through a communication network;

a primary cable station comprising:

a first filter having a first filter frequency bandwidth greater than a desired signal frequency bandwidth of the desired signal;

a first frequency shifter adapted to shifting a first end of the desired signal frequency bandwidth of the desired signal to an edge of the first filter frequency bandwidth to determine a first undesired signal that is outside the first filter frequency bandwidth;

a second filter having a second filter frequency bandwidth greater than the desired signal frequency bandwidth; and a second frequency shifter coupled between the first filter and the second filter and adapted to shifting a second end of the desired signal frequency bandwidth to an edge of the second filter frequency bandwidth to determine a second undesired signal that was not determined by the first frequency shifter.

* * * * *